(12) United States Patent
Singh et al.

(10) Patent No.: US 11,470,286 B2
(45) Date of Patent: Oct. 11, 2022

(54) IMAGE SENSORS WITH COLOR, PANCHROMATIC AND INFRARED PIXELS

(71) Applicants: Mritunjay Singh, Irvine, CA (US); Tripurari Singh, Seattle, WA (US)

(72) Inventors: Mritunjay Singh, Irvine, CA (US); Tripurari Singh, Seattle, WA (US)

( * ) Notice: Subject to any disclaimer, the term of this patent is extended or adjusted under 35 U.S.C. 154(b) by 0 days.

(21) Appl. No.: 16/929,092

(22) Filed: Jul. 14, 2020

(65) Prior Publication Data

US 2021/0021790 A1 Jan. 21, 2021

Related U.S. Application Data

(60) Provisional application No. 62/874,505, filed on Jul. 16, 2019.

(51) Int. Cl.
*H04N 9/04* (2006.01)
*H04N 5/33* (2006.01)

(52) U.S. Cl.
CPC .......... *H04N 9/0451* (2018.08); *H04N 5/332* (2013.01); *H04N 9/04555* (2018.08)

(58) Field of Classification Search
CPC ... H04N 9/0451; H04N 5/332; H04N 9/04555
See application file for complete search history.

(56) References Cited

U.S. PATENT DOCUMENTS

| | | | |
|---|---|---|---|
| 7,893,976 B2 * | 2/2011 | Compton | H04N 9/04559 348/277 |
| 9,467,665 B1 * | 10/2016 | Wang | G02B 5/201 |
| 9,692,992 B2 * | 6/2017 | Wu | H04N 9/04559 |
| 9,699,429 B2 * | 7/2017 | Kaizu | H04N 9/04555 |
| 2016/0173793 A1 * | 6/2016 | Mitsunaga | H04N 5/35563 348/229.1 |

* cited by examiner

*Primary Examiner* — Padma Haliyur

(57) ABSTRACT

A high sensitivity image sensor with panchromatic and color pixels arranged to enable high sensitivity, efficient binning and minimize aliasing is disclosed. Efficient binning is enabled by composing the color filter array of tiles containing pixels of at most two types, one panchromatic and the other colored, so that like color pixels to be binned are adjacent to each other. Aliasing is minimized by the twin methods of evenly spacing out tiles containing pixels of like color over the image sensor, and optimizing the arrangement of panchromatic and color pixels within each tile if the tile contains both panchromatic and colored pixels. An image sensor with these color filter arrays can be used to realize cameras with high sensitivity and a plurality of resolutions, with the lower resolutions consuming less power, while minimizing alias artifacts in each supported resolution. A variant of this image sensor with both infrared and color pixels is also disclosed.

22 Claims, 10 Drawing Sheets

| G | P | R | P |
|---|---|---|---|
| P | G | P | R |
| P | B | P | G |
| B | P | G | P |

| $T_B$ | $T_P$ | $T_R$ | $T_P$ |
|---|---|---|---|
| $T_P$ | $T_G$ | $T_P$ | $T_G$ |
| $T_R$ | $T_P$ | $T_B$ | $T_P$ |
| $T_P$ | $T_G$ | $T_P$ | $T_G$ |

(First Preferred Embodiment)

| G | P | R | P | G | P | R | P |
|---|---|---|---|---|---|---|---|
| P | G | P | R | P | G | P | R |
| P | B | P | G | P | B | P | G |
| B | P | G | P | B | P | G | P |
| G | P | R | P | G | P | R | P |
| P | G | P | R | P | G | P | R |
| P | B | P | G | P | B | P | G |
| B | P | G | P | B | P | G | P |

Figure 2

| G | R |
|---|---|
| B | G |

| G | P | R | P |
|---|---|---|---|
| P | G | P | R |
| P | B | P | G |
| B | P | G | P |

Figure 5 (First Preferred Embodiment)

| P | G | R | P |
|---|---|---|---|
| G | P | P | R |
| B | P | P | G |
| P | B | G | P |

Figure 6 (Second Preferred Embodiment)

| G | P | R | P |
|---|---|---|---|
| P | G | P | R |
| B | P | P | G |
| P | B | G | P |

Figure 7

| $T_B$ | $T_P$ | $T_R$ | $T_P$ |
|---|---|---|---|
| $T_P$ | $T_G$ | $T_P$ | $T_G$ |
| $T_R$ | $T_P$ | $T_B$ | $T_P$ |
| $T_P$ | $T_G$ | $T_P$ | $T_G$ |

Figure 8

| B | B | P | P | R | R | P | P |
|---|---|---|---|---|---|---|---|
| B | B | P | P | R | R | P | P |
| P | P | G | G | P | P | G | G |
| P | P | G | G | P | P | G | G |
| R | R | P | P | B | B | P | P |
| R | R | P | P | B | B | P | P |
| P | P | G | G | P | P | G | G |
| P | P | G | G | P | P | G | G |

Figure 9

| B | B | B | P | P | P | R | R | R | P | P | P |
|---|---|---|---|---|---|---|---|---|---|---|---|
| B | B | B | P | P | P | R | R | R | P | P | P |
| B | B | B | P | P | P | R | R | R | P | P | P |
| P | P | P | G | G | G | P | P | P | G | G | G |
| P | P | P | G | G | G | P | P | P | G | G | G |
| P | P | P | G | G | G | P | P | P | G | G | G |
| R | R | R | P | P | P | B | B | B | P | P | P |
| R | R | R | P | P | P | B | B | B | P | P | P |
| R | R | R | P | P | P | B | B | B | P | P | P |
| P | P | P | G | G | G | P | P | P | G | G | G |
| P | P | P | G | G | G | P | P | P | G | G | G |
| P | P | P | G | G | G | P | P | P | G | G | G |

Figure 10

IMAGE SENSORS WITH COLOR, PANCHROMATIC AND INFRARED PIXELS

RELATED APPLICATIONS

This application is based on and claims the benefit of priority of U.S. Provisional Application No. 62/874,505, filed Jul. 16, 2019, which is hereby incorporated by reference in its entirety.

FIELD OF THE INVENTION

This invention relates to a two-dimensional image sensor with improved light sensitivity, that can support efficient pixel binning while suppressing aliasing and the resulting moire and false color artifacts.

BACKGROUND OF THE INVENTION

An electronic imager consists of an image sensor and a Image Signal Processor to convert the sensor's output into a viewable image. The sensor typically consists of a two dimensional arrangement of photosites, each contributing to a pixel of the image. The photosite usually consists of a photodiode to detect the intensity of the incident light, but can also consist of a layer of photosensitive material.

In order to capture color, each photosite has a color filter deposited over its photosensitive part. This color filter mostly transmits a section of the visible electromagnetic spectrum and blocks the remaining. A regular mosaic pattern of color filters forms a Color Filter Array. Since each photosite of an image sensor with a color filter array captures one color of the pixel, the remaining color values are interpolated by Image Signal Processor.

One of the most popular color filter array patterns is the so called Bayer pattern consisting of red, green and blue color filters, see B. E. Bayer, "Color imaging array", Jul. 20, 1976. U.S. Pat. No. 3,971,065. High resolution image sensors often use a variant of the Bayer color filter array, referred to variously as Quad Bayer and Tetra cell, that enables high quality binning of pixels, see Isao Hirota, "Solid-State Imaging Device, Method for Processing Signal of Solid-State Imaging Device, and Imaging Apparatus", U.S Pat No. 2010/0141812 A1. Pixel binning is an averaging operation that combines neighboring pixels into a single larger pixel thereby effectively reducing the resolution of the image sensor and increasing its signal to noise ratio. High resolution image sensors use binning for preview and video modes.

RGB color filter array patterns such as the Bayer and Quad Bayer admit one primary color at any given photosite and block the remaining resulting in low sensitivity. In order to improve sensitivity, panchromatic pixels that admit more light than RGB pixels have been included in newer color filter arrays such as the one disclosed by T. Yamagami, T. Sasaki, A. Suga, "Solid-State Imaging Device, Method for Processing Singal of Solid-State Imaging Device, and Imaging Apparatus", U.S. Pat. No. 5,323,233. For high resolution sensors, color filter arrays containing panchromatic pixels that support binning have been proposed by John T. Compton, John F. Hamilton Jr, "Image Sensor with Improved Light Sensitivity", U.S. Pat. No. 8,139,130 B2.

BRIEF SUMMARY OF THE INVENTION

The present invention relates to capturing color images with a single image sensor, but with increased sensitivity by including panchromatic pixels, and also supporting efficient binning of pixels of like color. Binning of pixels is important for low light images and also for reducing the number of pixels read out and the power consumed in doing so.

Two classes of panchromatic color filter array patterns are disclosed, the first class supports efficient 2:1 pixel binning and the second class supports efficient 4:1, 9:1 binning and beyond. Both classes of color filter arrays are optimized for binning by being composed of tiles of pixels, so that only pixels in the same tile and of the same color are binned with the further possibility of Floating Diffusion binning if the binned pixels use a shared read out circuit.

The disclosed panchromatic color filter arrays are also optimized for reduced aliasing and the resulting moire and false color artifacts by the twin methods of evenly distributing tiles of the same color, or pair of colors, and optimizing the arrangement of panchromatic and color pixels within each tile if the tile contains both panchromatic and color pixels.

BRIEF DESCRIPTION OF THE DRAWINGS

FIG. 2 is a section of a color filter array pattern with a minimal repeating unit in bold.

FIG. 3 is the standard Bayer CFA formed by 2:1 binning.

FIG. 4 is the panchromatic color plane formed by 2:1 binning.

FIG. 5 provides the minimal repeating unit of the first preferred embodiment of a panchromatic color filter array supporting 2:1 binning.

FIG. 6 provides the minimal repeating unit of the second preferred embodiment of a panchromatic color filter array supporting 2:1 binning.

FIG. 7 provides the minimal repeating unit of the third preferred embodiment of a panchromatic color filter array supporting 2:1 binning.

FIG. 8 shows the minimal repeating unit, in terms of tiles k pixels wide and k pixels high, of the preferred embodiment of a panchromatic color filter array supporting $k^2:1$ binning.

FIG. 9 provides the minimal repeating unit of the preferred embodiment of a panchromatic color filter array supporting 4:1 binning.

FIG. 10 provides the minimal repeating unit of the preferred embodiment of a panchromatic color filter array supporting 9:1 binning.

DETAILED DESCRIPTION OF THE INVENTION

Figure 1:
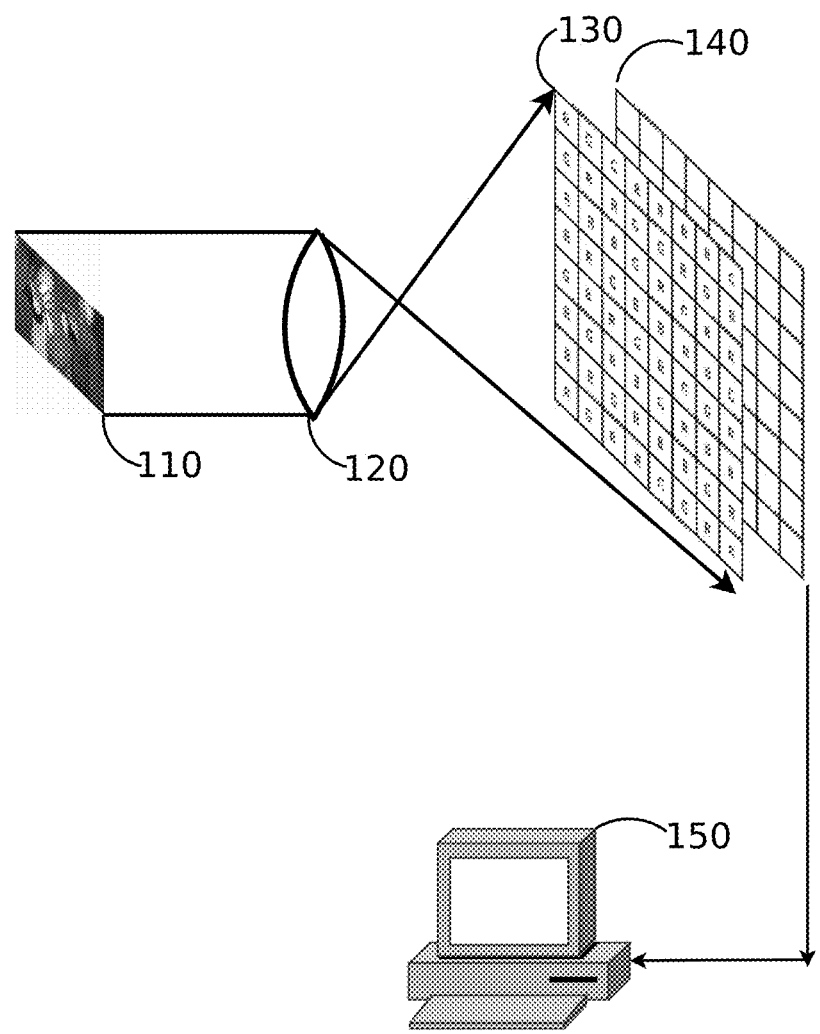
FIG. 1 is a schematic diagram of an exemplary color imaging system in accordance with an embodiment of the present invention.

A digital camera, shown in FIG. 1, will be familiar to one skilled in the art. An optical image of the scene, 110, is created by the lens 120, then filtered by a Color Filter Array, 130, and captured by the image sensor 140. The output of the image sensor is sent to the digital image signal processor 150 that reconstructs an electronic image of the scene from the received image sensor data.

In the context of an image sensor, a pixel refers to a discrete light sensing area and the associated circuit to measure the resulting charge and digitize the measurement. A pixel senses only one color in the types of image sensors considered by this invention. In the context of an image, a pixel refers to a particular location in the image with one value associated with it for a monochrome image and multiple values associated with it for a color or multispectral image.

The pixels of the image sensor have a set of spectral sensitivities corresponding to the set of basic colors to be captured. We use the term "basic colors" to refer to primary colors, secondary colors or any suitably selected set of colors that the imaging device senses. Additionally, the image sensors considered by this invention contain panchromatic pixels with wider spectral sensitivities than those of pixels of basic colors. This makes the panchromatic pixels more sensitive to incident light than pixels of basic colors, and so aids in capturing luminance information with higher signal to noise ratio than is possible with pixels of basic color alone. Different spectral sensitivities of pixels in a image sensor are usually realized by overlaying a color filter over the photosensitive area of the pixel. In this setting panchromatic pixels often have no color filters, or color filters with very wide spectral sensitivity. The arrangement of color filters over the pixels of the image sensor forms its so called Color Filter Array, Abbreviated to CFA.

All Color Filter Arrays considered by this invention consist of a repeating pattern of color filters. In this context a CFA can be defined by a patch of pixels, known as a repeating unit, which is juxtaposed horizontally, vertically and a combination thereof, followed by an operation of trimming its edges. A minimal repeating unit is a repeating unit that cannot itself be decomposed into smaller repeating units. An example CFA is shown in FIG. 2 with its minimal repeating unit highlighted in bold. Note that the minimal repeating unit is not unique and the CFA of FIG. 2 can be defined by 16 different minimal units.

Binning

In order to increase the photosensitivity, and reduce read out time and power consumption, the pixels can be combined, or binned, in various ways. For example, the charge from pixels of like color is binned in an image sensor (see FIG. 1, image sensor 140) by connecting in parallel capacitive elements, such as photo diodes and floating diffusions, holding these charges. In CMOS image sensors, pixels sharing a common readout circuit can be conveniently binned by connecting the photodiodes of the pixels to be binned to a common floating diffusion.

Binning can also be performed after the charge in the pixel is converted to a voltage, by summing the voltage outputs of the pixels to be binned. Binning can also be performed after the voltage output of the pixel is digitized, by the Analog to Digital Converter, by adding the digital outputs of the pixels to be binned.

Pixels can be binned in more than one manner depending on the mode of operation of the camera and the lighting conditions. For example, preview modes that need a low resolution video stream can be generated by binning several pixels into one. Video capture at a higher resolution can be performed by binning fewer pixels into one. Still image capture, at even higher resolutions, can be performed by binning even fewer pixels into one. When light is low and the exposure is short, a larger number of pixels can be binned to improve sensitivity at the expense of resolution. It should be noted that binning is optional in every situation, and can be omitted if not needed.

This invention aims to address the problem of aliasing and its manifestations as false color and moire by disclosing effective CFA patterns. In full resolution mode, images captured using panchromatic CFAs are prone to aliasing because of the sparsity of pixels of any given color. In the binned mode, images captured using panchromatic CFAs are prone to aliasing because of the relatively high spatial frequency bandwidth of the optical image compared to the density of the binned pixels in the image sensor. Aliasing is also influenced by the geometry of the effective pixel formed by binning, where the term "effective pixel" is defined as the union of the pixels combined together by binning. Aliasing is the most severe in the direction along which the effective pixel is the narrowest.

Preferred Embodiment for 2:1 Binning

Our preferred embodiment is a CFA pattern, containing panchromatic pixels, and a set of pixels of basic colors such as red, green and blue with the properties described below. Its first property is that the CFA is composed of tiles 2 pixels wide and 2 pixels high, so that each tile consists of two panchromatic pixels and two other pixels of the same basic color, for example red, green and blue. This property allows efficient binning of like colored pixels within each tile and low power read out of the resulting half resolution images.

The second property of the preferred embodiment is that in the binned mode the image sensor outputs the industry standard bayer mosaic, shown in FIG. 3, and a panchromatic color plane, shown in FIG. 4, both of half resolution along each of the two image dimensions. This allows for the denoising of the Bayer mosaic with the low noise panchromatic color plane, followed by processing of the Bayer mosaic using a standard Image Signal Processor. Alternately, the Bayer output can be first demosaicked and the resulting image can be denoised with the help of the low noise panchromatic color plane.

A tile two pixels wide and two pixels high, as described above, can be partitioned into two diagonals, henceforth referred to as tile diagonals, one composed of the top-left and bottom-right pixels, and the other composed of bottom-left and top-right pixels. The tile can alternately be partitioned into two rows, or two columns. The panchromatic pixels can be arranged either along a row, or a column or a diagonal, with the color pixels arranged along the other row, other column or other diagonal, respectively. The third property of our preferred embodiment is that the panchromatic and color pixels are arranged along tile diagonals. When binning is performed along tile diagonals the direction of greatest aliasing of the panchromatic color-plane is along a diagonal and the direction of greatest aliasing of the color color-plane is along the other diagonal. Since natural images contain more high frequencies in the horizontal and vertical directions, than in any other direction, diagonal arrangement helps minimize aliasing in natural images.

The fourth property of our preferred embodiment is that all the panchromatic pixels are not arranged along tile diagonals oriented in the same direction. This implies that all the color pixels are also not arranged along tile diagonals oriented in the same direction. This switching of diagonal directions reduces aliasing, and the resulting moire and false color artifacts, on simple image features such as a set of diagonal lines. Even if aliasing does occur, the switching of tile diagonal directions randomizes aliasing artifacts and so reduces their visibility and makes the resulting false color more amenable to removal by denoising and other techniques. Both the binned and full resolution modes of the image sensor benefit from switching of tile diagonal directions.

If all tile diagonals of a given color are in the same direction, but differ from the direction of the tile diagonals of other colors, then the benefit stems from aliases of different colors being most severe on different image features. This reduces the worst case severity of aliasing and so makes aliasing more amenable to removal by denoising and other techniques. Both the binned and full resolution modes of the image sensor benefit from having pixels of different colors arranged along tile diagonals of different directions.

The first exemplary embodiment is shown in FIG. 5. In addition to the panchromatic pixels, green pixels are also arranged along tile diagonals in both directions. Red pixels are arranged along tile diagonals in one direction and blue pixels are arranged along tile diagonals in the other direction. Panchromatic pixels have the largest impact on picture quality as they capture most of the luminance information, followed by green pixels. Hence, our first embodiment has more panchromatic and green pixels than red or blue pixels and also arranges panchromatic and green pixels along tile diagonals in both directions so as to suppress their aliases. Red and blue pixels are arranged on tile diagonals in different directions so as to de-correlate their aliases from each other.

The second exemplary embodiment is shown in FIG. 6. Its panchromatic pixels are arranged along tile diagonals in both directions, but all red and all blue pixels are arranged along tile diagonals in one direction while all green pixels are arranged along tile diagonals in the other direction. Panchromatic pixels have the largest impact on picture quality as they capture most of the luminance information, followed by green pixels. Hence, our second embodiment has more panchromatic and green pixels than red or blue pixels and also arranges panchromatic pixels along tile diagonals in both directions so as to suppress their aliases. Red and blue pixels are arranged along tile diagonals in one direction and green along tile diagonal in the other direction so as to de-correlate their aliases from each other.

Figure 7:
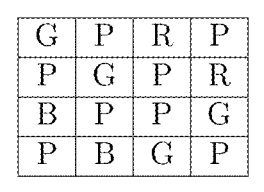

The third exemplary embodiment is shown in FIG. 7. In addition to the panchromatic pixels, green pixels are also arranged along tile diagonals in both directions. Red and blue pixels are arranged along tile diagonals in one direction. Panchromatic pixels have the largest impact on picture quality as they capture most of the luminance information, followed by green pixels. Hence, our third embodiment has more panchromatic and green pixels than red or blue pixels and also arranges panchromatic and green pixels along tile diagonals in both directions so as to suppress their aliases.

Preferred Embodiment for $k^2$:1 Binning

High resolution image sensors and image sensors operating in low light can benefit from binning more than 2 pixels into 1. We disclose a family of panchromatic CFA designs composed of tiles k pixels wide and k pixels high so that all the $k^2$ pixels of a tile are either panchromatic or of the same basic color and can be binned into 1 effective pixel.

Figure 8:
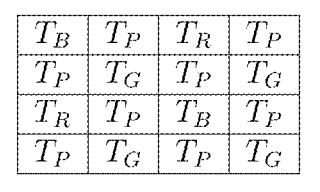

FIG. 8 shows the preferred arrangement of tiles to form a minimal repeating unit, with $T_P$ being a tile of panchromatic pixels, $T_R$ being a tile of red pixels, $T_G$ being a tile of green pixels, and $T_B$ being a tile of blue pixels. The first property of this pattern is the relative number of pixels of each type: panchromatic pixels are the most numerous since they have the greatest impact on image quality, followed by half as many green pixels which is the most important basic color and a quarter as many red and blue pixels each.

A second property of the preferred pattern of FIG. 8 is that it has the maximum distance between the closest pair of tiles of the same color among all possible patterns containing equal number of red and blue tiles, twice as many green tiles as red tiles and twice as many panchromatic tiles as green tiles. This property of evenly distributing tiles of each color helps minimize aliasing and the resulting moire and false color artifacts.

FIG. 9 shows the minimal repeating unit for the preferred embodiment for 4:1 binning using k=2. FIG. 10 shows the minimal repeating unit for the preferred embodiment for 9:1 binning using k=3.

All the CFA patterns disclosed in this application can be modified to use basic colors other than red, green and blue, including, but not limited to cyan, magenta and yellow.

All the CFA patterns disclosed in this application can be generalized by substituting pixels of the shown colors with pixels of arbitrary photoresponses in the visible spectrum, the infra-red spectrum and the ultra-violet spectrum.

What is claimed:

1. An image sensor for capturing a color image, comprising:
    a two-dimensional array having four groups of pixels denoted by P, A, B, C, each with a unique photoresponse to the electromagnetic spectrum; and
    said pixels are arranged in tiles of two pixels wide and two pixels high such that each tile contains two pixels of one type arranged along one diagonal and two pixels of a second type arranged along the other diagonal, where one of the pixel types is P and the other is one of either A, B or C, so that not all tiles have pixels of type P along the diagonals oriented in the same direction.

2. The image sensor of claim 1 wherein two pixels of like color in a tile are configured so as to combine by binning the charge from the pixels, or by converting the charge to voltage and summing the voltages of the pixels, or by digitizing the voltages and adding the digital outputs of the pixels.

3. The image sensor of claim 2 wherein the charges from the pixels to be binned are summed by connecting the said pixels' photodiodes to a common floating diffusion, and the resulting voltage at the floating diffusion is measured.

4. The image sensor of claim 2 with the following minimal repeating unit:

| A | P | B | P |
|---|---|---|---|
| P | A | P | B |
| P | C | P | A |
| C | P | A | P | or its reflection or rotation, or a combination thereof.

5. The image sensor of claim 4, wherein pixels from the group P have wider spectral photoresponses than pixels from groups A, B, C, and A is green, B is red and C is blue.

6. The image sensor of claim 4, wherein one group of P, A, B, C pixels has photoresponse predominantly in the infrared spectrum while the other three are red, green and blue.

7. The image sensor of claim 2 with the following minimal repeating unit:

| P | A | B | P |
|---|---|---|---|
| A | P | P | B |
| C | P | P | A |
| P | C | A | P | or its reflection or rotation, or a combination thereof.

8. The image sensor of claim 7, wherein pixels from the group P have wider spectral photoresponses than pixels from groups A, B, C, and A is green, B is red and C is blue.

9. The image sensor of claim 7, wherein one group of P, A, B, C pixels has photoresponse predominantly in the infrared spectrum while the other three are red, green and blue.

10. The image sensor of claim 2 with the following minimal repeating unit:

| A | P | B | P |
|---|---|---|---|
| P | A | P | B |
| C | P | P | A |
| P | C | A | P | or its reflection or rotation, or a combination thereof.

11. The image sensor of claim 10, wherein pixels from the group P have wider spectral photoresponses than pixels from groups A, B, C, and A is green, B is red and C is blue.

12. The image sensor of claim 10, wherein one group of P, A, B, C pixels has photoresponse predominantly in the infrared spectrum while the other three are red, green and blue.

13. An image sensor for capturing a color image, comprising:
a two-dimensional array having four groups of pixels denoted by P, A, B, C, each with a unique photoresponse to the electromagnetic spectrum; and
said pixels are arranged in tiles of k pixels wide and k pixels high, with k>1, such that all $k^2$ pixels of each tile are of one group P, A, B or C and arranged in the following minimal repeating unit:

| $T_B$ | $T_P$ | $T_C$ | $T_P$ |
|---|---|---|---|
| $T_P$ | $T_A$ | $T_P$ | $T_A$ |
| $T_C$ | $T_P$ | $T_B$ | $T_P$ |
| $T_P$ | $T_A$ | $T_P$ | $T_A$ | where $T_P$ is a tile k pixels wide and k pixels high of pixel type P, $T_A$ is a tile k pixels wide and k pixels high of pixel type A, $T_B$ is a tile k pixels wide and k pixels high of pixel type B, and $T_C$ is a tile k pixels wide and k pixels high of pixel type C.

14. The image sensor of claim 13 wherein the $k^2$ pixels of like color in a tile are configured so as to combine by binning the charge from the pixels, or by converting the charge to voltage and summing the voltages of the pixels, or by digitizing the voltages and adding the digital outputs of the pixels, or any combination thereof.

15. The image sensor of claim 14 wherein the charges from the pixels to be binned are summed by connecting the said pixels' photodiodes to a common floating diffusion, and the resulting voltage at the floating diffusion is measured.

16. The image sensor of claim 13 with a minimal repeating unit formed by reflection, rotation, or a combination thereof, of the minimal repeating unit of claim 13.

17. The image sensor of claim 16 with k=2 so that its minimal repeating unit is the following:

| B | B | P | P | C | C | P | P |
|---|---|---|---|---|---|---|---|
| B | B | P | P | C | C | P | P |
| P | P | A | A | P | P | A | A |
| P | P | A | A | P | P | A | A |
| C | C | P | P | B | B | P | P |
| C | C | P | P | B | B | P | P |
| P | P | A | A | P | P | A | A |
| P | P | A | A | P | P | A | A | or its reflection or rotation, or a combination thereof.

18. The image sensor of claim 17, wherein pixels from the group P have wider spectral photoresponses than pixels from groups A, B, C, and A is green, B is red and C is blue.

19. The image sensor of claim 17, wherein one group of P, A, B, C pixels has photoresponse predominantly in the infrared spectrum while the other three are red, green and blue.

20. The image sensor of claim 16 with k=3 so that its minimal repeating unit is the following:

| B | B | B | P | P | P | C | C | C | P | P | P |
|---|---|---|---|---|---|---|---|---|---|---|---|
| B | B | B | P | P | P | C | C | C | P | P | P |
| B | B | B | P | P | P | C | C | C | P | P | P |
| P | P | P | A | A | A | P | P | P | A | A | A |
| P | P | P | A | A | A | P | P | P | A | A | A |
| P | P | P | A | A | A | P | P | P | A | A | A |
| C | C | C | P | P | P | B | B | B | P | P | P |
| C | C | C | P | P | P | B | B | B | P | P | P |
| C | C | C | P | P | P | B | B | B | P | P | P |
| P | P | P | A | A | A | P | P | P | A | A | A |
| P | P | P | A | A | A | P | P | P | A | A | A |
| P | P | P | A | A | A | P | P | P | A | A | A | or its reflection or rotation, or a combination thereof.

21. The image sensor of claim 20, wherein pixels from the group P have wider spectral photoresponses than pixels from groups A, B, C, and A is green, B is red and C is blue.

22. The image sensor of claim 20, wherein one group of P, A, B, C pixels has photoresponse predominantly in the infrared spectrum while the other three are red, green and blue.

* * * * *